INVENTOR
SAMUEL LEVEN
AGENT

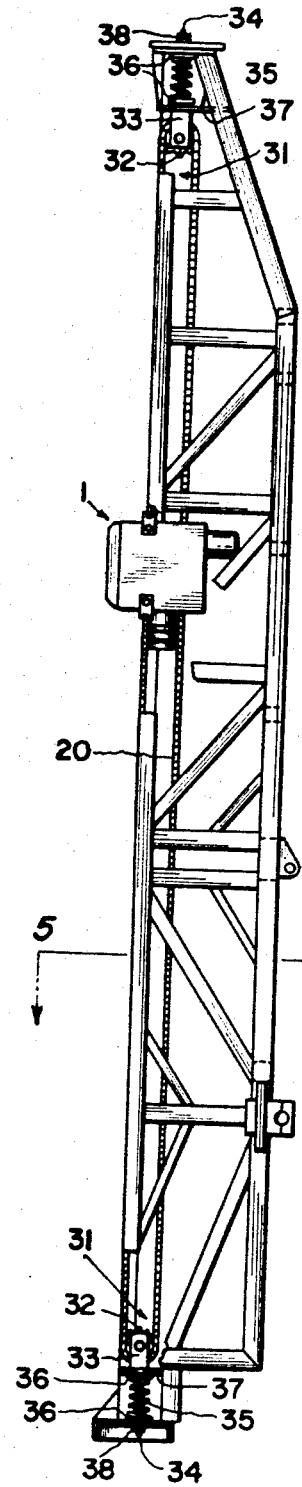
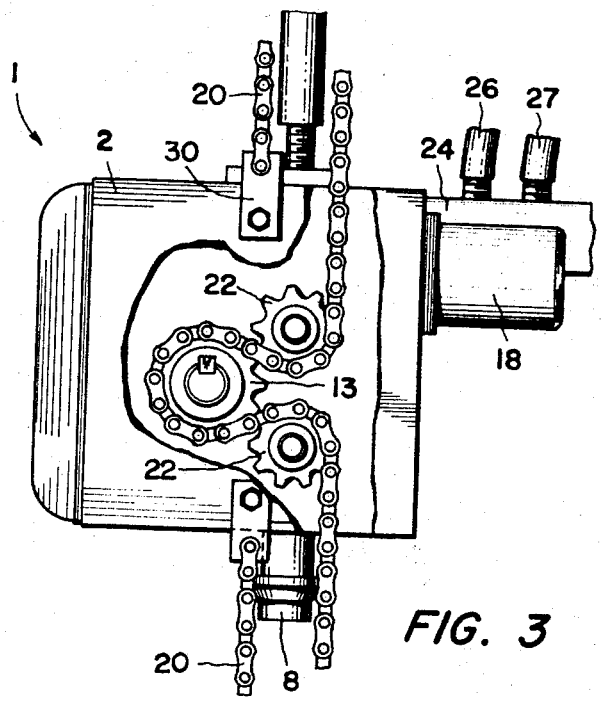
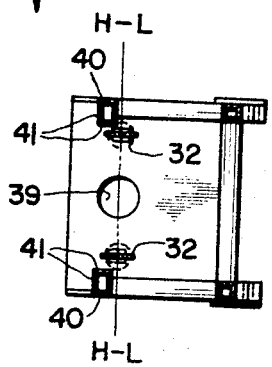
FIG. 3
FIG. 5
FIG. 4
INVENTOR
SAMUEL LEVEN
AGENT

United States Patent Office 3,446,295
Patented May 27, 1969

3,446,295
DRILLING HEAD
Samuel Leven, Easton, Pa., assignor to Ingersoll-Rand Company, New York, N.Y., a corporation of New Jersey
Filed June 28, 1967, Ser. No. 649,585
Int. Cl. E21c 5/06, 5/04; B23q 5/06
U.S. Cl. 173—147    10 Claims

ABSTRACT OF THE DISCLOSURE

A drilling head, slidably mounted on a drill tower, which carries a spindle, both rotary and feed fluid-actuated motors, and feed and pivot sprockets. The feed motor raises and lowers the head through chains engaging the sprockets in a block-and-tackle arrangement to apply the displacement force along a line transverse to, and on a plane bisecting the centerline of the spindle. Further, the head carries a junction block, and tubing, for receipt and distribution of pressurized fluid for the motors and spindle.

---

This invention pertains to drilling heads, used with a drill tower, having independent feed and rotary motors, and especially to a drilling head which carries the spindle and both the rotary and feed motors therewith.

Prior feed and hoist arrangements, for drilling heads having independent feed and rotation motors, associate the rotation motor in adjacency with the spindle, and dispose the feed motor and its related components on the drill tower. These known arrangements lack an efficient unity, in that a portion of the apparatus is carried with the spindle and a portion is mounted, in a remote relationship, on the tower. The known arrangements are not adaptable for "angle drilling"; because of their dispersal of motive means, they are met with difficulties arising out of angular displacements of cables and power shafts, and the like. For the known apparatus, then, it is necessary to provide separate and independent fluid or electrical power lines to each subassembly at its distinct location. Usually an additional line is further required to supply cleansing and flushing fluid to the spindle, chuck and drill rod. Also, the known drilling head arrangements dispose the feed apparatus parallel to, or offset from, the spindle and must transmit the hoisting and lowering force through a transverse arm, bracket, or a part of the housing. The effect is to cause a loss of feed energy, or to require a greater driving torque, to "cantilever" the spindle into motion. That is, the feed force is developed at a first location and then must be communicated therefrom along a cantilever arrangement, i.e., along a plane perpendicular to the axis of the spindle, to effect movement thereof. Further, the known prior art feed arrangements employ a linear mechanical force, to displace the drilling head. In this, the prior art disposes a feed chain about a single sprocket—or a pair of spaced sprockets which, in unison, rotate in the same direction—to impart a given torque from a given feed motion source. It is an object of this invention, therefore, to provide a universal or unitized drilling head having both the rotation motor and the feed motor mounted with and carried by the head. Another object of this invention is to provide a drilling head which applies the feed force directly to the head so as to be effective fully across the center of the drilling head housing on a line transversing the centerline of the spindle, and on a plane bisecting said centerline. A further object of the invention is to provide a drilling head which carries therewith all motive power means for rotation and feed and carries a receiver and distributor means for fluid actuation of the power means and channeling for supplying cleansing and flushing fluid to the spindle, greatly simplifying its adaptation for "angle drilling." Still another object of this invention is to provide a drilling head and a feed arrangement therefor which realizes a mechanical advantage—which imparts a greater torque from a given feed motion source—as compared to the teachings in the prior art.

A feature of this invention is the disposition of both the feed motor and the rotation motor on, and their carriage by, the drilling head. Another feature of this invention is the disposition of parallel feed sprockets and feed chains on either sides of the drilling head in a deployment which develops lifting and lowering force at said sides and therebetween centrally of the spindle. Still another feature of this invention is the arrangement of feed chains about sprockets in a block-and-tackle layout so as to realize a mechanical advantage. Other objects and features of this invention will become more apparent from the following description taken in conjunction with the accompanying figures in which:

FIGURE 3 is a side elevation view of the drilling head with a portion of the housing cut away to show the threading of the feed chain about the sprocket arrangement;

FIGURE 4 is a side elevation of the tower, with the drilling head mounted thereon, with portions of the tower cut away; and FIGURE 5 is a sectional view of the tower taken along line 5—5 of FIGURE 4.

Figure 1:
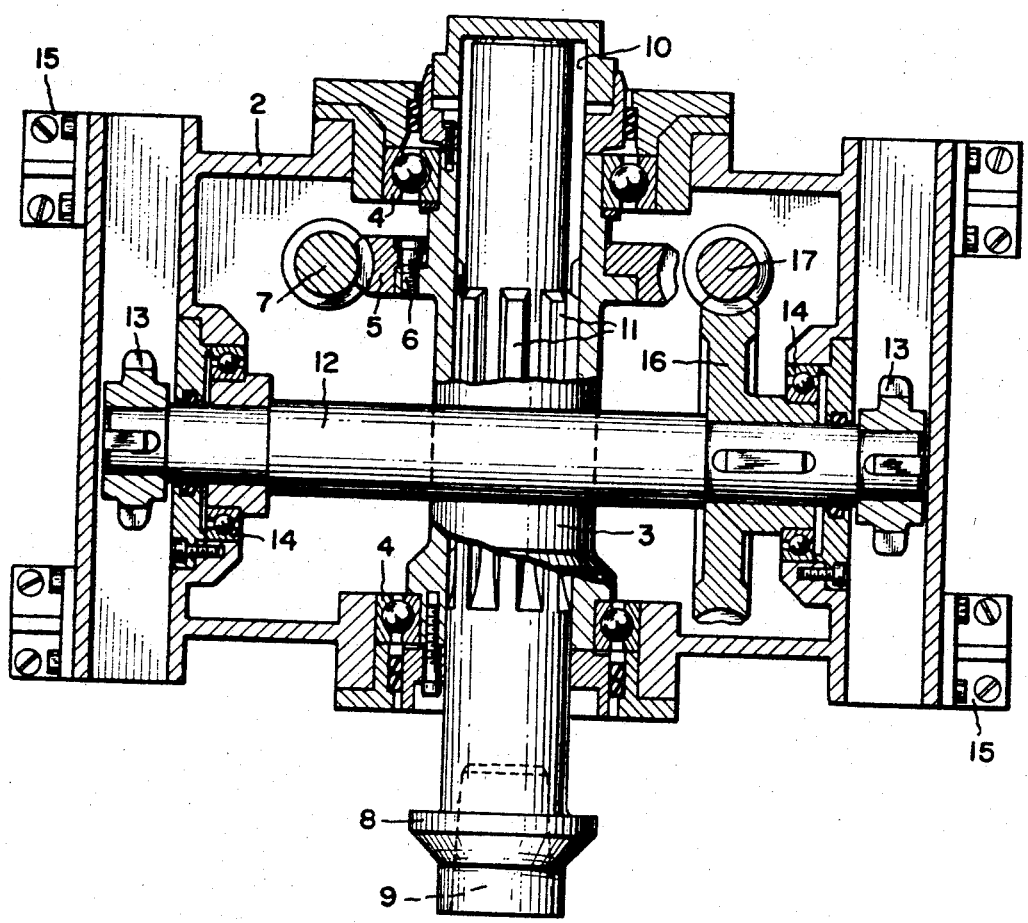
FIGURE 1 is a front elevational cross-sectional view of the drilling head according to the invention.
Figure 2:
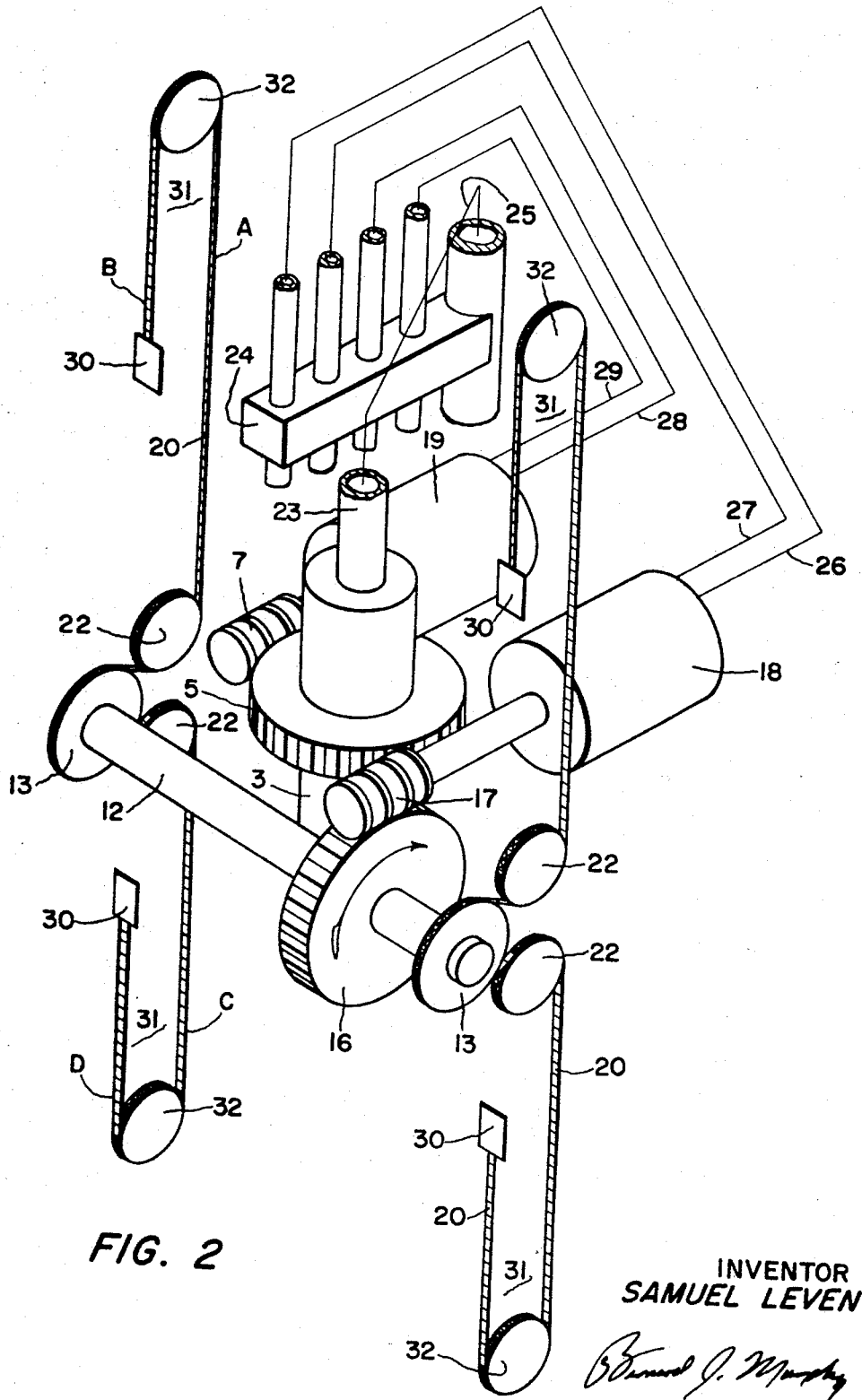
FIGURE 2 is a schematic of the gearing and tubing of the drilling head of FIGURE 1 shown in perspective.

As seen in FIGURE 1 the drilling head 1 is shown having a housing 2 in which is mounted a spindle 3. The spindle is rotatable in the housing, being mounted on bearings 4. A first worm wheel gear 5 is coupled to the spindle 3 by fastening means 6 and mates with a first worm gear 7 from which the worm wheel gear 5 derives power (as will be described subsequently). The spindle 3 receives a chuck 8 having an internally-threaded aperture 9 in which can be mounted a drill rod. The spindle has a spline cavity 10 which mates with external splines 11 formed on the outer surface of the chuck 8. Chuck 8 is free to float, axially, in spline cavity 10. This feature provides a particularly beneficial facility when coupling and uncoupling drilling rods to and from chuck 8. By virtue of this floating design, it is required only to rotate the chuck 8 via spindle 3, while holding the rod which is to be coupled or uncoupled, to effect the engagement or disengagement. As will be recognized, the chuck 8, can be moved axially, relative to the spindle 3, by virtue of the slidable relationship between spline cavity 10 and splines 11. Therefore, chuck 8 threadably turns on the drill rod, or threadably removes from the drill rod by being rotated only. There is no requirement for lowering or raising the drilling head housing 2. A feed shaft 12 is disposed across the housing, transverse to the spindle 3, and mounted at either ends thereof are feed sprockets 13. The feed shaft is rotatably journaled in bearings 14 mounted in the housing 2. At the outer edges of housing 2 are mounted slide brackets 15 which retain the housing laterally on the drill tower, transmit the rotary torque to the drill tower, and support the housing for sliding movement therealong. There are eight such brackets 15 (only four of which are shown), two pair of each at each side of the drilling head. Feed shaft 12 further has a second worm wheel gear 16 mounted near one end thereof which is in engagement with a second worm gear 17 from which it derives motion (for purposes which will be explained hereafter). Referring now to FIGURE 2, there is shown a feed motor 18 coupled to the second worm gear 17 and a rotation motor 19 coupled to the first worm gear 7. Chains 20 are shown partially wrapped about, and in engagement with feed sprockets 13. Chains 20 are further disposed about and in engagement with pairs of pivot sprockets 22, there being a pair at either sides of the housing 2 (FIGURE 1) to which they are mounted. The spindle 3 has a fluid passageway 23 formed through the center thereof for the introduction of cleansing fluid. The housing 2 (FIGURE 1) also mounts a junction block 24 to which pressurized fluid is introduced by tubing coupled therebeneath. Conduit 25 throughconnects junction block 24 with the fluid passageway 23 of the spindle. The feed motor 18 and rotation motor 19 are of the fluid-actuated type, and derive pressurized fluid from the junction block 24 by means of tubing. The pressurized fluid for forward motion of the feed motor 18 is passed through "down tubing" 26; pressurized fluid for the motion of the feed motor is passed through "up tubing" 27. "Forward tubing" 28 and "reverse tubing" 29 provide pressurized fluid to the rotation motor 19. Clearly, the feed and rotation motors, in an alternate embodiment of the invention, could be electrically-powered and actuated, without departing from the teaching of my invention.

FIGURE 3 presents a side elevation view of the drilling head with a portion of the housing 2 cut away to show the disposition of a feed chain 20 about a feed sprocket 13 and pivot sprockets 22, and further shows a portion of junction block 24, "down" and "up tubing" 26 and 27, and the coupling of chain 20 to the housing 2 at 30. As shown in FIGURE 4, the chain 20 forms loops 31 which are disposed about sprocket pulleys 32 secured to either ends of the drill tower. The sprocket pulleys 32 each have covers 33, in which they are rotatably secured, which mount a rod 34, and springs 35 between thrust washers 36 disposed on the rod 34. One of the washers holds the sprocket pulleys 32 and covers 33 against a tower strut 37 which has a hole through which the rod 34 is placed. The furthermost washer is held on the rod 34 by two nuts 38. The sprocket pulley arrangement provides for self-tightening mounting of the chain loops 31.

FIGURE 5 shows the tower, in cross-section along section 5—5 of FIGURE 4, and locates the sprocket pulleys 32 relative thereto. The aperture 39 is formed in a base plate of the tower to accommodate the chuck 8 (FIG. 3). Finally, tower members 40 present surfaces 41 across which the slide brackets 15 (FIG. 1) are disposed for sliding movement therealong.

In operation, pressurized fluid is introduced to the junction block 24 (FIGURE 2) by tubing coupled therebeneath. Through remote control means (not shown, but known to those skilled in the art) pressurized fluid is admitted selectably to the tubing; i.e., to effect a feeding of the drilling head, pressurized fluid is admitted to "down tubing" 26. The fluid actuates the feed motor 18 which turns the second worm gear 17. The worm gear is in engagement with second worm wheel gear 16. The latter, being coupled to the feed shaft 12, rotates same to turn the feed sprockets 13 mounted at either end of the feed shaft 12. As the feed sprockets 13 turn—in this "down"-actuated mode—they conform to the rotary direction indicated by the arrow on second worm wheel gear 16. Accordingly, the uppermost chain loop 31 is increased, the lowermost chain loop 31 is diminished, and the drilling head moves downward.

Rotation of the spindle 3 is effected by rotation motor 19 which, in a "forward"-actuated mode of operation, for instance, is operated by selectable feeding of pressurized fluid through "forward tubing" 28 from the junction block 24. Rotation of motor 19 is imparted through first worm gear 7, coupled to the motor output shaft, mating with first worm wheel gear 5 coupled to the spindle.

The drilling head mounts, in one compact unit, the feed and rotation motors, feed sprockets, and fluid input for the drill hole cleaning and for the motors. Further, this novel arrangement provides for the hoisting force to be effective fully across the center of the housing 2, transverse to the centerline of the spindle 3 and on a plane bisecting said centerline. These latter provisions are indicated in the following description, taken in conjunction with the illustrations in FIGURES 2, 3 and 5. The feed sprockets 13, deriving power through feed shaft 12, worm wheel gear 16, and worm gear 17 from feed motor 18, are, like the pivot sprockets 22, mounted on the housing 2. With rotation of the feed sprockets 13 in the direction indicated by the arrow (on worm wheel gear 16), links of chain 20 will pass around the feed and pivot sprockets 13, 22. Where two or three links are given up to uppermost sprocket pulley 32, the same number of links must be taken from (i.e., given up by) the lowermost sprocket pulley 32. In that the sprocket pulleys 32 are arrested on the drill tower the resultant movement is imparted to the moveable structure, the drilling head 1. More, as the chains 20 are deployed about sprocket pulleys 32, which are in linear alignment along the drill tower, with the pivot sprockets 22, and the ends thereof are returned and fixed to the housing 2 at 30, the resultant force is imparted to the drilling head at the axial centers of the pivot sprockets 22 and thereacross along the hoist-lower line H-L indicated in FIGURE 5, which bisects the centerline of the spindle.

The feed chains 20 are arranged so as to produce a 2:1 mechanical advantage. Upon review of FIGURE 2 it will become evident that the feed sprocket 13 will rotate at rate X to produce a hoisting or lowering of the drilling head at rate $X/2$. Feed sprocket 13 rotates to pass, I will assume for purposes of illustration, ten links of chain 20. Accordingly, five of the links are given up to the length A of chain 20 and five of the links are given up to the length B. The ten links are taken, five each, from lengths C and D. The displacement imparted to the drilling head is equal to the amount of elongation of length B, to wit: five links, although the feed sprocket 13 has payed-out ten links. The arrangement, then, similar to a block-and-tackle, delivers twice the amount of lifting or lowering torque or force, as compared to the linear feed arrangements practiced in the prior art. This mechanically advantaged force, joined in a structure which addresses the force to the very centerline of the spindle 3 and fully across the housing 2 teaches a novel and significant improvement in the drilling head art.

While I have described my invention in connection with specific apparatus it is to be clearly understood that this is made only by way of example and not as a limitation to the scope of my invention as set forth in the objects thereof and in the accompanying claims.

I claim:
1. In combination with a drill tower, a drilling head, comprising: a housing; first means for coupling said housing to the tower for axial movement of said housing therealong; a rotatable spindle carried by said housing; second means, carried by said housing, coupled to said spindle for rotation thereof; and third means, carried by said housing and supported by said tower, for applying mechanically advantaged axial movement forces directly to said housing.

2. The invention, according to claim 1, wherein said third means comprise means for applying lifting forces directly to said housing on a line transversing the centerline of said spindle, and on a plane bisecting said centerline.

3. The invention, according to claim 1, wherein said third means comprise means for applying lowering forces directly to said housing on a line transversing the centerline of said spindle, and on a plane bisecting said centerline.

4. The invention, according to claim 1, wherein:
said spindle axially and slidably carries a chuck for coupling of drill rods thereto.

5. The invention, according to claim 1, wherein said third means comprise means for applying the mechanically advantaged axial movement forces directly to said housing at opposite sides thereof along a line transversing said housing, and on a plane which bisects the axial center of said spindle.

6. The invention, according to claim 1, wherein: said second means comprise motor means, and a gear train which couples said motor means and said spindle means and communicates motion therebetween.

7. The invention, according to claim 1, wherein: said third means comprise motor means, sprocket means, a gear train which couples said motor means and said sprocket means for communicating motion therebetween, and a chain engaging said sprocket means, the ends of said chain being coupled to said housing and portions thereof being coupled to the drill tower.

8. The invention, according to claim 1, wherein: said spindle has an axial hole formed therethrough.

9. The invention, according to claim 8, further comprising: a fluid-pressure junction block carried by said housing for receiving pressurized fluid; and a conduit throughconnecting said junction block with said axial hole.

10. The invention, according to claim 9, wherein: said second and third means comprise fluid-actuated motors; and further comprising tubing throughconnecting said junction block with said fluid actuated motors.

References Cited

UNITED STATES PATENTS

| | | | |
|---|---|---|---|
| 1,317,875 | 10/1919 | Hansen | 173—147 X |
| 2,594,098 | 4/1952 | Vanderzee | 173—147 X |
| 2,776,114 | 1/1957 | Brown | 173—147 X |
| 2,869,826 | 1/1959 | Thornburg | 173—147 |
| 3,009,521 | 11/1961 | Failing | 173—147 X |

NILE C. BYERS, JR., *Primary Examiner.*